United States Patent [19]

Matsuoka et al.

[11] Patent Number: 5,574,344
[45] Date of Patent: Nov. 12, 1996

[54] POWER STEERING APPARATUS FOR PERFORMING FEEDBACK CONTROL OF MOTOR-DRIVING CURRENT

[75] Inventors: Hirofumi Matsuoka, Kyoto; Ken Fukuda, Kashiwara, both of Japan

[73] Assignee: Koyo Seiko Co., Ltd., Osaka, Japan

[21] Appl. No.: 502,759

[22] Filed: Jul. 14, 1995

[30] Foreign Application Priority Data

Aug. 2, 1994 [JP] Japan .................................. 6-181392
May 25, 1995 [JP] Japan .................................. 7-126769

[51] Int. Cl.$^6$ ................................ B62D 5/04; H02P 1/22
[52] U.S. Cl. ...................... 318/293; 388/819; 318/291; 318/294
[58] Field of Search .................................. 318/256, 257, 318/280, 283, 287, 289, 291, 293, 294, 430, 431, 432, 474, 599; 388/800, 804, 809, 811, 816, 819

[56] References Cited

U.S. PATENT DOCUMENTS 4,871,039 10/1989 Daido et al. .
4,879,641 11/1989 Rossi et al. .............................. 363/98
4,972,133 11/1990 Hirota et al. ....................... 318/293 X
5,153,487 10/1992 Hennig .................................... 318/293
5,341,286 8/1994 Inoue et al. .

FOREIGN PATENT DOCUMENTS 522492   1/1993  European Pat. Off. .
3-164093 7/1991  Japan .
2202501  9/1988  United Kingdom .

Primary Examiner—Bentsu Ro
Attorney, Agent, or Firm—Darby & Darby, P.C.

[57] ABSTRACT

A power steering apparatus for use in association with an electric motor, includes a switch circuit driven by a PWM wave signal which switches between one polarity and the other of the voltage developed across a motor-driving current detecting resistance synchronously with the PWM wave signal so as to detect the magnitude and direction of the motor-driving current, thereby controlling a duty cycle of the PWM wave signal in accordance with the detected motor-driving current. Thus, the motor steering touch and feeling is enhanced.

6 Claims, 13 Drawing Sheets

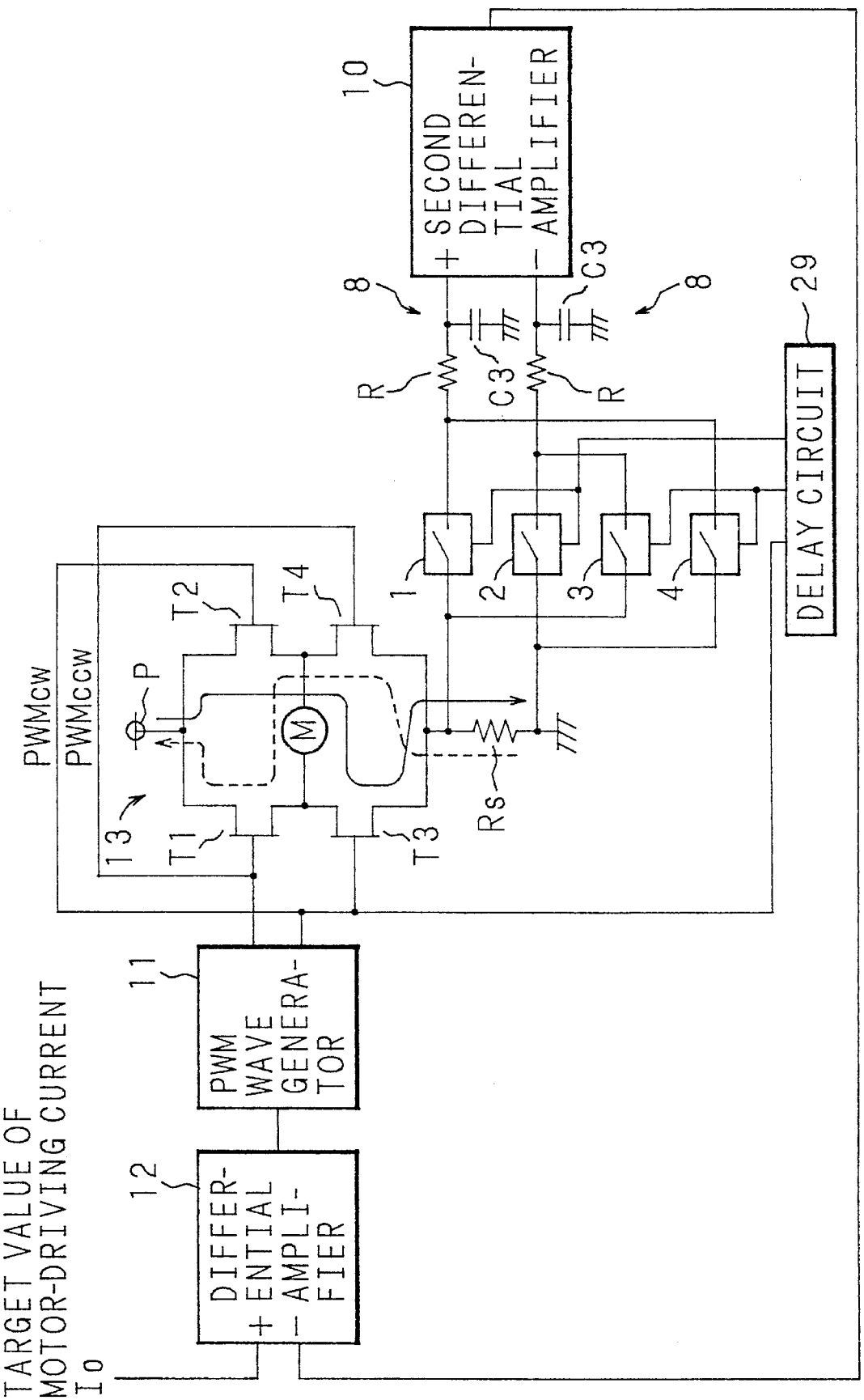

POWER STEERING APPARATUS FOR PERFORMING FEEDBACK CONTROL OF MOTOR-DRIVING CURRENT

BACKGROUND OF THE INVENTION

1. Field of the Invention

The present invention relates to a power steering apparatus for use in association with an electric motor so as to perform the feedback control of a motor-driving current, wherein the steering apparatus includes a motor driving circuit which is driven in response to PWM (pulse width modulation) wave signals.

2. Description of the Background Art

FIG. 1 is a block diagram showing a motor driving circuit and a motor-driving current detecting circuit used in a known power steering apparatus:

The illustrated power steering apparatus includes a motor driving circuit 13 which includes bridge-connected transistors (switching elements) T1 to T4, and a motor M connected in such a manner as to connect two junctions, that is, the junctions between the transistors T1 and T3 and between the transistors T2 and T4. The pair of transistors T1 and T4, and the pair of transistors T2 and T3 are respectively connected in series through the motor M. Each pair of transistors T1-T4 and T2-T3 are driven in response to the PWM wave signals $PWM_{CCW}$ and $PWM_{CW}$, from a PWM wave generator (not shown) received at the respective gates. The PWM wave signals $PWM_{CCW}$ and $PWM_{CW}$ are mutually complementary in pulse width as shown in FIG. 2 wherein each has a duty ratio of 50%, thereby allowing no motor-driving current to flow.

The transistors T1 and T2 are located toward a power source P for the motor M, and the transistors T3 and T4 are located toward the earth. The sources of the transistors T1 and T2 are connected to the power source P, and the drains of the transistors T3 and T4 are connected to one terminal of a resistance Rs for detecting a motor-driving current, the other terminal of which is grounded. The resistance Rs (hereinafter "detecting resistance Rs") has a source-side terminal connected to a non-invertible input terminal of a differential amplifier 10, and an earth-side terminal connected to an invertible input terminal thereof. In this way, the voltage developed across the detecting resistance Rs generated by a motor-driving current are inputted to the differential amplifier 10.

In the motor driving circuit 13 and the differential amplifier 10, in a case where the duty ratio of the PWM wave signal $PWM_{CW}$ is larger than that of the PWM wave signal $PWM_{CCW}$, if the PWM wave signal $PWM_{CW}$ is on, and the PWM wave signal $PWM_{CCW}$ is off, the transistors T2 and T3 are on, and the transistors T1 and T4 are off, thereby enabling the motor-driving current to flow as indicated in the full line in FIG. 1. At this stage, the input voltage $V_+$ (in the case of the full line) at the non-invertible input terminal of the differential amplifier 10 becomes positive as shown in FIG. 3 (wherein the invertible input terminal is grounded), thereby enabling the differential amplifier 10 to output a positive voltage.

When the PWM wave signal $PWM_{CW}$ is off and the PWM wave signal $PWM_{CCW}$ is on, the transistors T2 and T3 are off and the transistors T1 and T4 are on. Because of the inductance of the motor M, a voltage is induced in such a direction as to prevent the motor-driving current from abruptly changing in the motor M. The induced voltage progressively becomes stronger than the voltage at the power source P, thereby enabling the motor-driving current to flow through the transistors T1 and T4 as indicated in the dotted line in FIG. 1.

Within the motor M the motor-driving current flows in the same direction (from right to left in FIG. 1) as the direction in which it flows when the PWM wave signal $PWM_{CW}$ is on, but since it flows through the transistors T1 and T4, it flows through the detecting resistance Rs in an opposite direction (from down to up in FIG. 1) to the direction in which it flows when the PWM wave signal $PWM_{CW}$ is on. At this stage, the input voltage $V_-$ (in the case of the dotted line) at the invertible input terminal of the differential amplifier 10 becomes higher than the input voltage $V_+$ at the non-invertible terminal thereof, thereby enabling the differential amplifier 10 to output a negative voltage as shown in FIG. 3.

Under the known arrangement referred to above, a different value (polarity is opposite) from that of a motor-driving current within the motor M is detected. As a result, if the output of the differential amplifier 10 is used to perform the feedback control of the motor-driving current as it is, no smooth steering touch or feeling cannot be achieved. In order to use the output of the differential amplifier 10 to correctly perform the feedback control of the motor-driving current, an extra circuit is required to judge the direction of the flow of the motor-driving current.

SUMMARY OF THE INVENTION

Accordingly, the present invention is directed to solve the problems pointed out above, and it is an object to provide a power steering apparatus which eliminates the necessity of using an extra circuit for detecting the direction of a motor-driving current, and which nevertheless can accurately perform the feedback control of the motor-driving current.

Another object of the present invention is to provide a power steering apparatus which is free from a detection error due to a switching delay in the switch circuit or a responding delay in the amplifier. This object is achieved by providing a delay circuit for delaying the leading edge of a PWM wave signal and a holding circuit for holding an output from the switch circuit during the time period of the delay circuit.

According to one aspect of the present invention, there is provided a power steering apparatus which is provided with a motor driving circuit including a motor connected to bridged connected switching elements in such a manner as to bridge two opposite pairs of the switching elements; a PWM wave generating circuit for driving a selected pair of switching elements connected in series through the motor; a motor-driving current detecting resistance connected between the motor driving circuit and a power source for the motor; and a motor-driving current detecting circuit including a switch circuit for switching from one polarity to the other of the voltage developed across the motor-driving current detecting resistance, so as to detect a motor-driving current based on an output from the switch circuit.

In this arrangement, the switch circuit switches the polarities of the voltage developed across the motor-driving current detecting resistance synchronously with a PWM wave signal for driving the switch circuit. As a result, the motor-driving current detecting circuit can accurately detect the magnitude and direction of a motor-driving current in the motor.

Preferably, the motor-driving current detecting circuit is provided with an amplifier connected to the motor-driving current detecting resistance, and the switch circuit is connected to the output terminal of the amplifier. In this arrangement the switch circuit can switch between two polarities of the amplified signals, thereby minimizing a difference between the input voltage and the output voltage at the switch circuit. As a result, an unfavorable influence due to the difference can be prevented, thereby performing an exact feedback of the magnitude and direction of the motor-driving current.

Preferably, the power steering apparatus is provided with a delay circuit for receiving the PWM wave signal and delaying the leading edge thereof before it is outputted to the switch circuit, and the switch circuit switches from one polarity to the other of the voltage developed across the motor-driving current detecting circuit synchronously with an output signal from the delay circuit. This preferred embodiment ensures that the power steering apparatus is free from a detection error due to a switching delay in the switch circuit or a responding delay in the amplifier.

Preferably, the power steering apparatus is provided with a holding circuit for holding an output from the switch circuit during the delay time period of the delay circuit. As a result, it is ensured that a blank time (i.e., a period when the switch circuit is off) occurring because of the delayed leading edge of the PWM wave signal is compensated with an immediately previous output, thereby reducing a detection error.

The above and further objects and features of the invention will more fully be apparent from the following detailed description with the accompanying drawings.

BRIEF DESCRIPTION OF THE DRAWINGS

FIG. 13 is a block diagram showing a fourth example embodying the present invention.

DETAILED DESCRIPTION OF THE PREFERRED EMBODIMENTS

EXAMPLE 1

Figure 4:
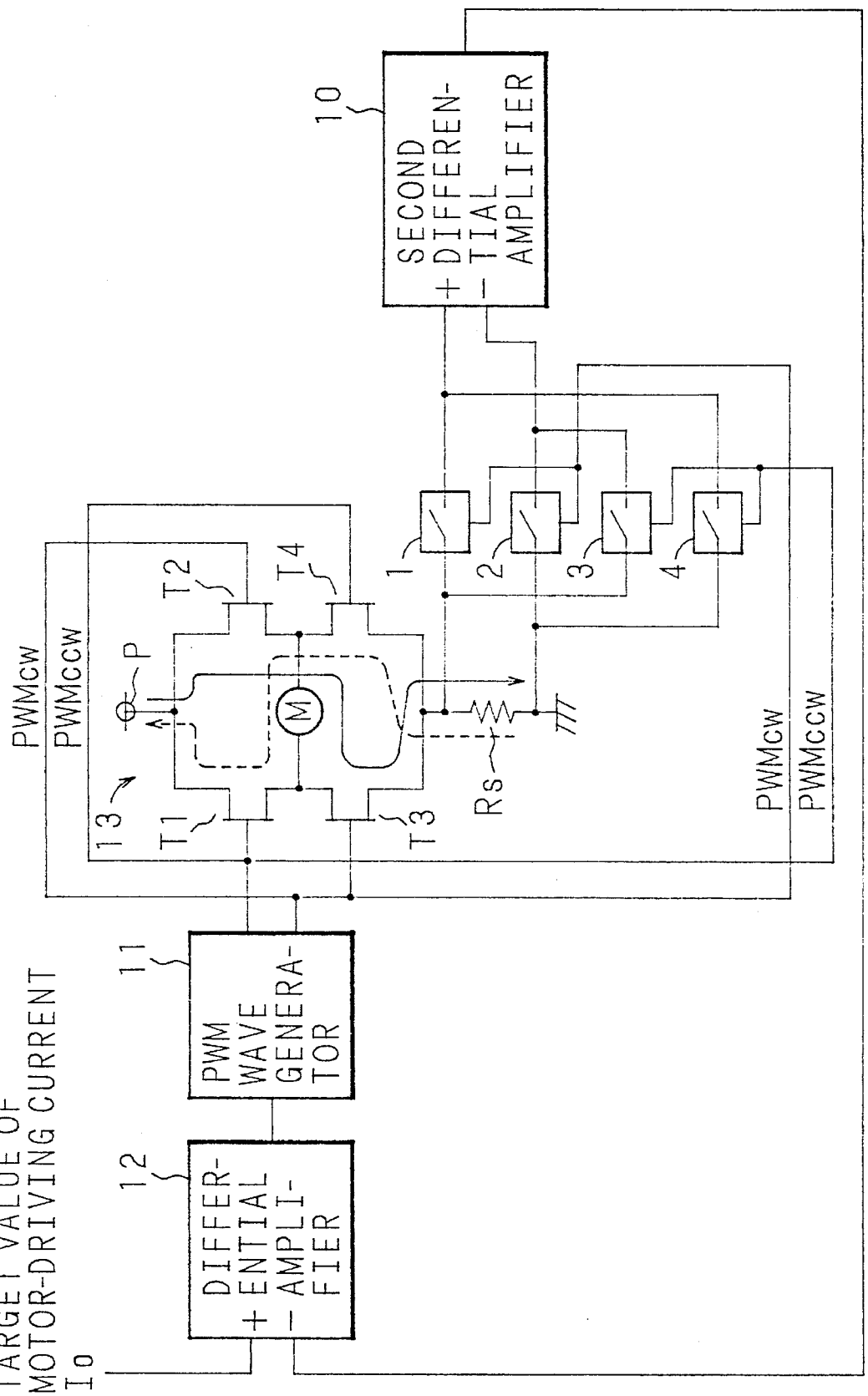
FIG. 4 is a block diagram showing a first example embodying the present invention.

Referring to FIG. 4, the exemplary power steering apparatus includes a differential amplifier 12 which receives a signal $I_0$ at its non-invertible input terminal, the signal $I_0$ representing a target value of a motor-driving current determined on the basis of a steering torque detected by a known torque sensor (not shown) or the like. The invertible input terminal of the differential amplifier 12 receives an input of a detection value of the motor-driving current described below. The output of the differential amplifier 12 is inputted to a PWM wave generating circuit (hereinafter "PWM wave generator") 11.

The PWM wave generator 11 outputs not only a PWM wave signal $PWM_{CW}$ but also a complementary signal $PWM_{CCW}$ to a motor driving circuit 13. When the output of the differential amplifier 12 is 0 (zero), the PWM wave generator 11 outputs a PWM wave signal $PWM_{CW}$ having a 50% duty ratio, and when the output thereof is positive (plus), it outputs a PWM wave signal $PWM_{CW}$ having a duty ratio of not smaller than 50% determined depending upon the output value of the differential amplifier 12. When the output thereof is negative (minus), it outputs a PWM wave signal $PWM_{CW}$ having a duty ratio of not larger than 50% determined depending upon the output value of the differential amplifier 12.

Figure 1:
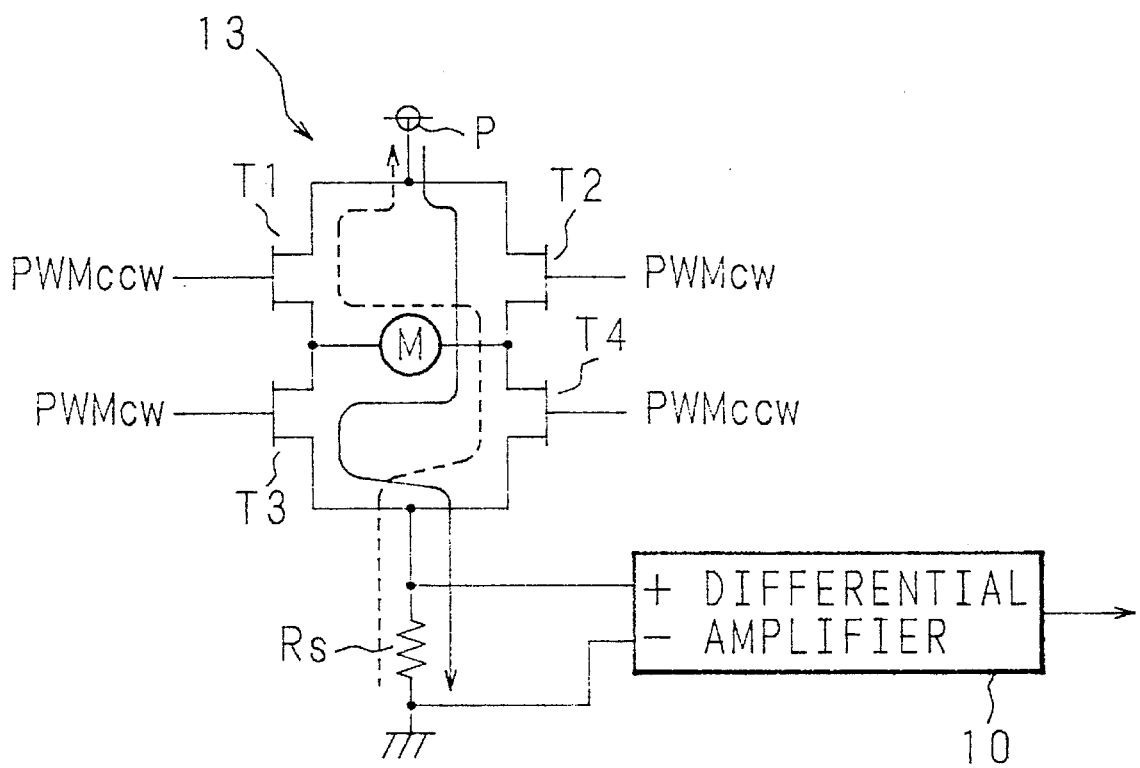
FIG. 1 is a block diagram showing a known power steering apparatus, particularly showing a motor driving circuit and a motor-driving current detecting circuit.
Figure 2:
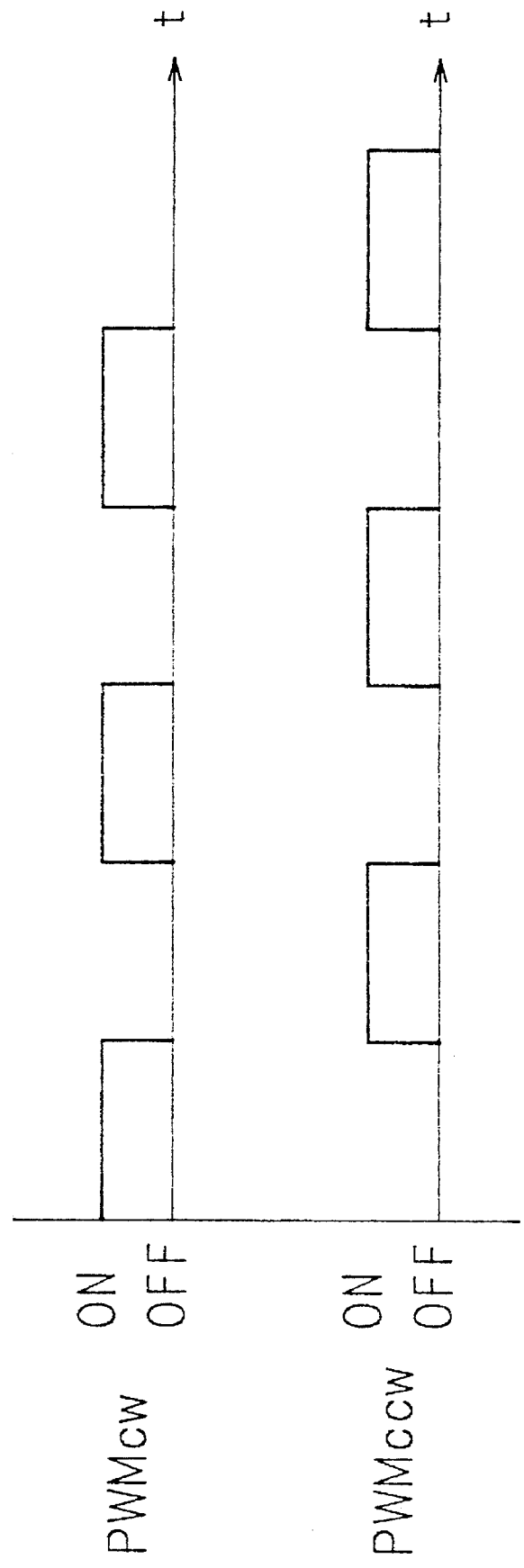
FIG. 2 shows waveforms of two PWM wave signals being mutually complementary.
Figure 3:
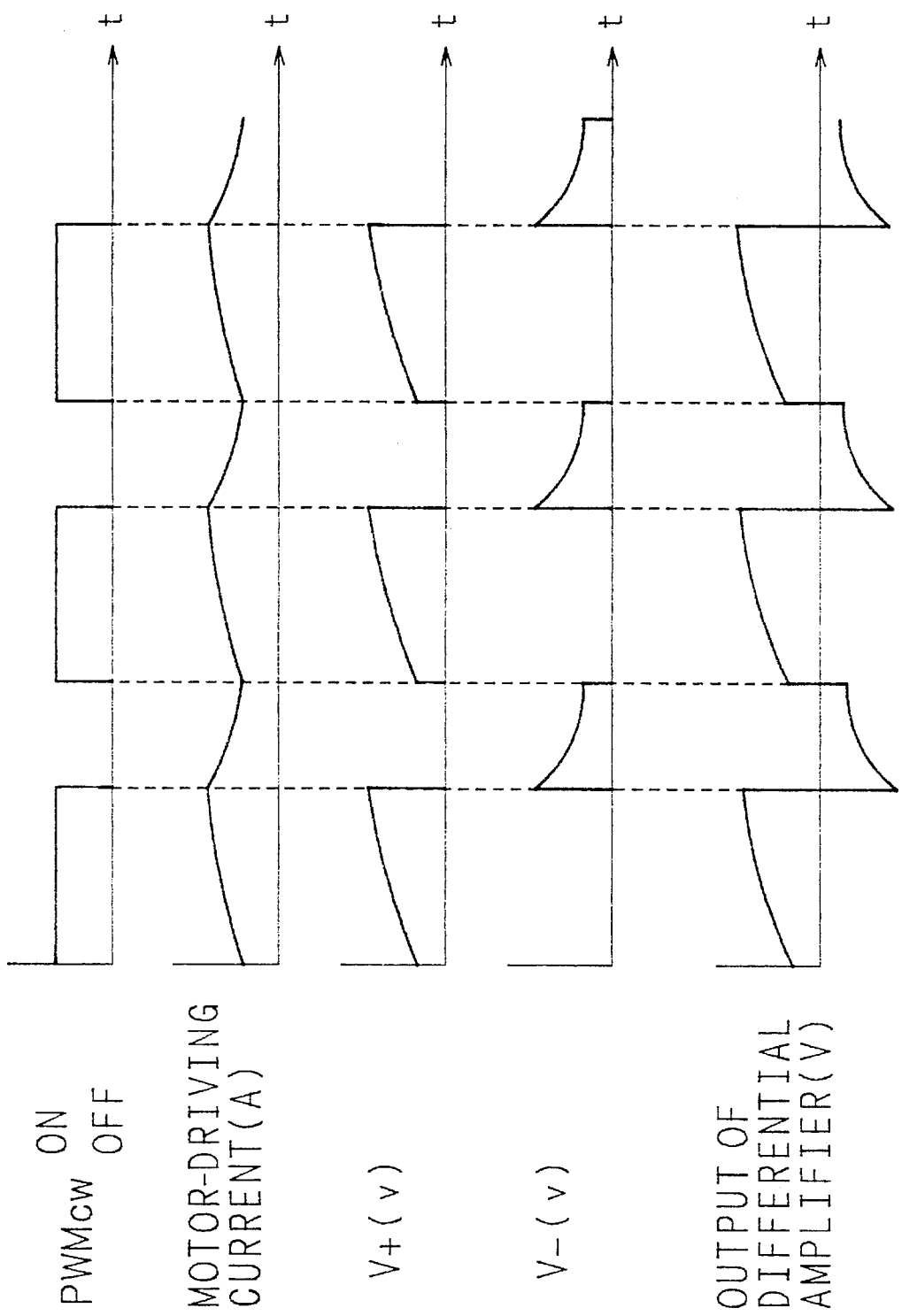
FIG. 3 shows waveforms of signals in each part of the known power steering apparatus.

The motor driving circuit 13 includes transistors T1 to T4 in bridge connection as switching elements, and a motor M disposed in such a manner as to connect two junctions, that is, the junctions between the transistors T1 and T3 and between the transistors T2 and T4. The pair of transistors T1 and T4, and the pair of transistors T2 and T3 are respectively connected in series through the motor M. Each pair of transistors T1–T4 and T2–T3 are driven in response to the PWM wave signals $PWM_{CCW}$ and $PWM_{CW}$ from a PWM wave generator 11 (not shown) received at the respective gates. The PWM wave signals $PWM_{CCW}$ and $PWM_{CW}$ are mutually complementary in pulse width as shown in FIG. 2 wherein each has a duty ratio of 50%, thereby allowing no motor-driving current to flow.

The transistors T1 and T2 are located toward the power source P of the motor M, and the transistors T3 and T4 are located toward the earth. The sources of the transistors T1 and T2 are connected to the power source P, and the drains of the transistors T3 and T4 are connected to one terminal of a resistance Rs for detecting a motor-driving current, the other terminal of the resistance Rs (hereinafter "detecting resistance Rs") being grounded.

The source-side terminal of the detecting resistance Rs is connected to a non-invertible input terminal of another differential amplifier (hereinafter "second differential amplifier") 10 through a first switch circuit 1 and to an invertible input terminal thereof through a second switch circuit 3. The first switch circuit 1 receives an input of a PWM wave signal $PWM_{CW}$ and the second switch circuit 3 receives an input of a complementary PWM wave signal $PWM_{CCW}$. The earth-side terminal of the detecting resistance Rs is connected to an invertible terminal of the second differential amplifier 10 through a switch circuit 2 which receives an input of a PWM wave signal $PWM_{CW}$ and to a non-invertible input terminal through a switch circuit 4 which receives an input of a complementary PWM wave signal $PWM_{CCW}$.

The output of the second differential amplifier 10 is inputted to the invertible input terminal of the first differential amplifier 12 where any deviation is obtained between the output and the signal $I_0$ representing a target value of a motor-driving current so as to use it to perform the feedback control of the motor-driving current.

Figure 5:
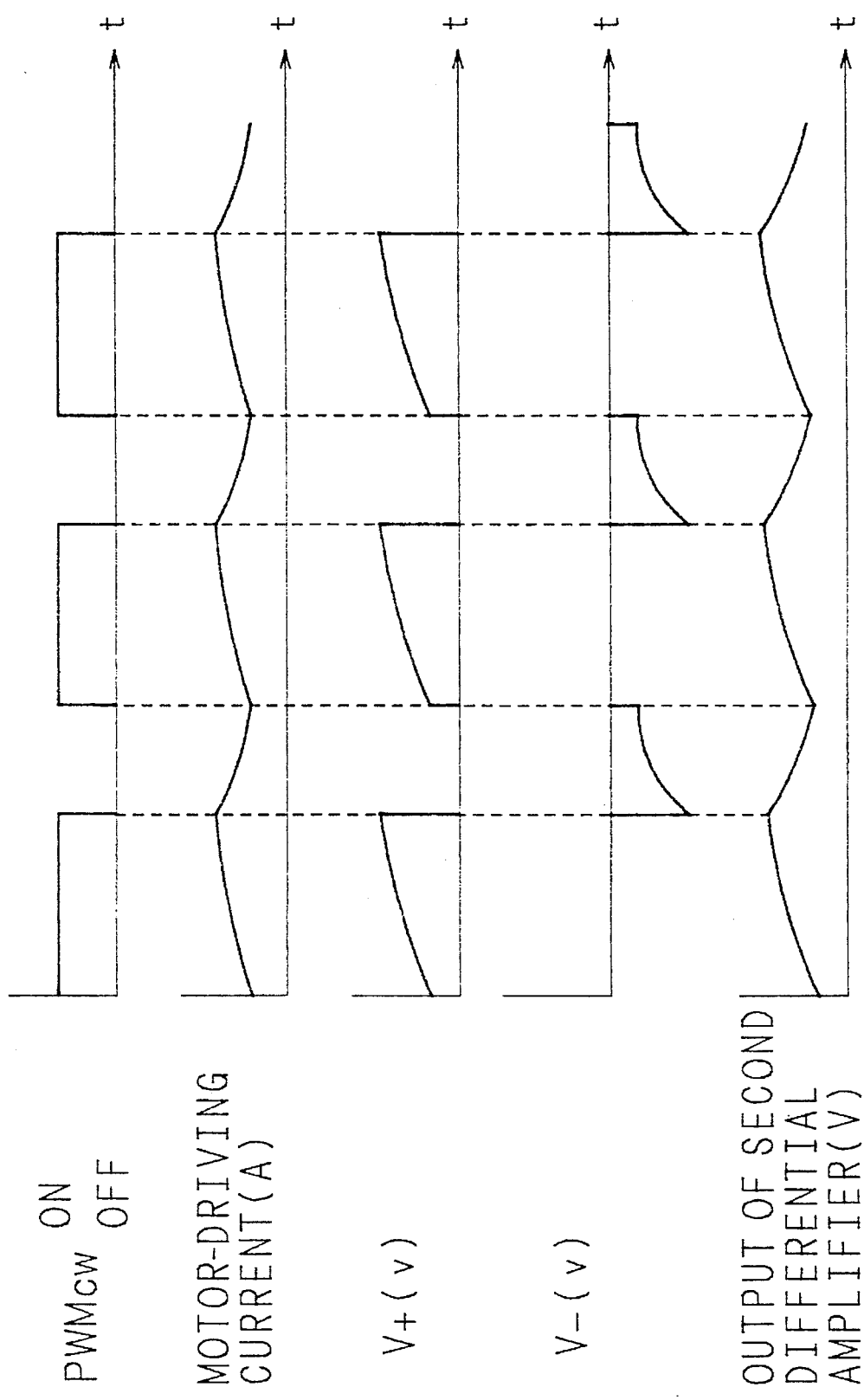
FIG. 5 shows waveforms of a signal in each part of the first example.

The power steering apparatus according to EXAMPLE 1 is operated as follows:

Referring to FIG. 5, in a case where the duty ratio of the PWM wave signal $PWM_{CW}$ is larger than that of the PWM wave signal $PWM_{CCW}$, if the signal $PWM_{CW}$ is on and the signal $PWM_{CCW}$ is off, the transistors T2 and T3 are on, and the transistors T1 and T4 are off. Thus the motor-driving current is allowed to flow as indicated in the full line (FIG. 4). At this stage, the switches 1 and 2 which receives an input of the PWM wave signal $PWM_{CW}$ are on, and the switches 3 and 4 which receive an input of the PWM wave signal $PWM_{CW}$ are off. As a result, the input voltage $V_+$ at the non-invertible input terminal of the second differential amplifier 10 becomes positive, and the output of the second differential amplifier 10 becomes positive as shown in FIG. 5.

When the PWM wave signal $PWM_{CW}$ is off and the PWM wave signal $PWM_{CCW}$ is on, the transistors T2 and T3 are off and the transistors T1 and T4 are on. Because of the inductance of the motor M, a voltage is induced in such a direction as to prevent the motor-driving current from abruptly changing in the motor M. As the induced voltage progressively becomes stronger than the voltage at the power source P, the motor-driving current flows through the transistors T1 and T4 as indicated in the dotted line in FIG. 4.

At this stage, the switch circuits 1 and 2 are off, and the switch circuits 3 and 4 are on. As a result, the non-invertible input terminal of the differential amplifier 10 is grounded but as shown in FIG. 5, the input voltage $V_-$ at the invertible input terminal of the second differential amplifier 10 is negative, thereby enabling it to generate a positive output.

Within the motor M a motor-driving current flows in the same direction (from right to left in FIG. 4) as it does when the PWM wave signal $PWM_{CW}$ is on, but since it flows through the transistors T1 and T4, it flows in an opposite direction (from down to up in FIG. 4) through the resistance Rs to the direction in which it flows when the PWM wave signal $PWM_{CW}$ is on.

At this stage the output of the second differential amplifier 10 has already become positive with the switch circuits 1 and 2 being off, and the switch circuits 3 and 4 being on because of the switching of voltage developed across the detecting resistance Rs inputted to the second differential amplifier 10. In one periodic cycle of the PWM wave signal the output of the second differential amplifier 10 remains positive in the same way as it is when the PWM wave signal $PWM_{CW}$ is on.

In a case where the duty ratio of a PWM wave signal $PWM_{CCW}$ is larger than that of a $PWM_{CW}$, the transistors T1 and T4 are on, and the transistors T2 and T3 are off when the PWM wave signal $PWM_{CCW}$ is on and the PWM wave signal $PWM_{CW}$ is off, thereby enabling a motor-driving current to flow in an opposite direction as indicated by the dotted line (FIG. 4). At the same time the switch circuits 3 and 4 each having the PWM wave signal $PWM_{CCW}$ are on, and the switch circuits 1 and 2 each having the PWM wave signal $PWM_{CW}$ are off. As a result, the non-invertible terminal of the second differential amplifier 10 is grounded, and the invertible terminal thereof receives an input of a positive voltage, and the output of the second differential amplifier 10 becomes negative.

When the PWM wave signal $PWM_{CCW}$ is off, and the PWM wave signal $PWM_{CW}$ is on, the transistors T1 and T4 are off and the transistors T2 and T3 are on. At this moment a voltage is induced in such a direction as to prevent the motor-driving current from abruptly changing within the motor M. Is the induced voltage progressively becomes stronger than the voltage at the power source P, a motor-driving current flows in an opposite direction as indicated by the full line (FIG. 4) through the transistors T2 and T3. At this stage the switch circuit 3 and 4 are off, and the switch circuits 1 and 2 are on. As a result, the invertible input terminal of the second differential amplifier 10 is grounded and the non-invertible input terminal thereof receives an input of a negative voltage and the output of the second differential amplifier 10 becomes negative.

Within the motor M this motor-driving current flows in the same direction as it does when the PWM wave signal $PWM_{CCW}$ is on (in FIG. 4, from left to right), but flows through the transistors T2 and T3, it flows in an opposite direction (from down to up in FIG. 4) through the resistance Rs to the direction in which it flows when the PWM wave signal $PWM_{CCW}$ is on.

At this stage the output of the second differential amplifier 10 has already become negative with the switch circuits 3 and 4 being off, and the switch circuits 1 and 2 being on because of the switching of voltage developed across the detecting resistance Rs inputted to the second differential amplifier 10. In one periodic cycle of the PWM wave signal the output of the second differential amplifier 10 remains negative in the same way as it is when the PWM wave signal $PWM_{CCW}$ is on.

The power steering apparatus according to Example 1, the current value within the motor M is detected together with its direction, so that the output of the second differential amplifier 10 can be used to perform the feedback control of a motor-driving current.

Figure 6:
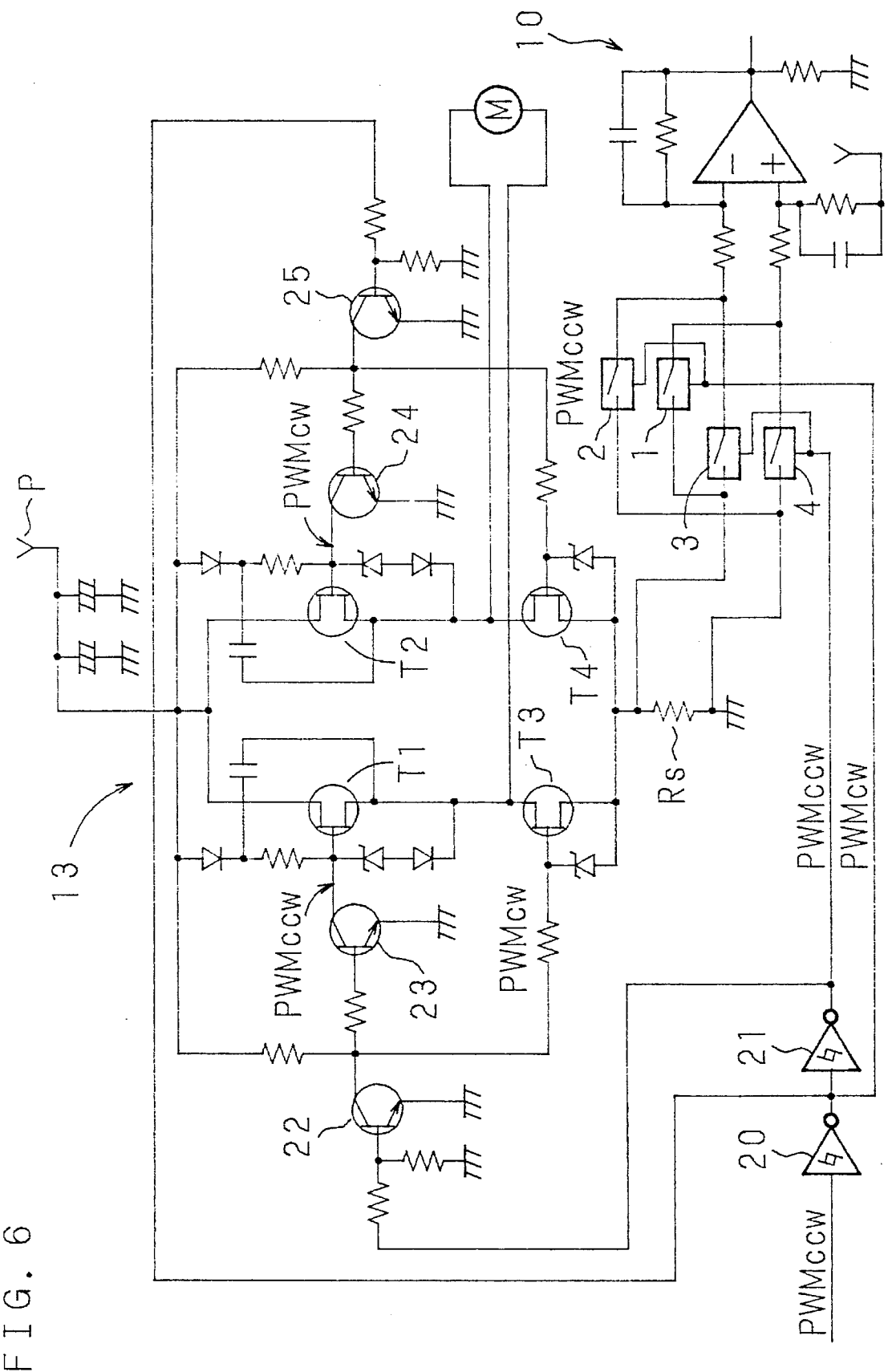
FIG. 6 is a circuit diagram showing the structure of the first example in a greater detail.

Referring to a circuit diagram of FIG. 6, wherein the PWM wave generator 11 and the differential amplifier 12 are omitted for simplicity, the other configuration is same as that shown FIG. 4 and the corresponding part are designated by the same characters and the explanation is omitted. A practical form of power steering apparatus according to Example 1 will be described:

The transistors T1 to T4 are field effect transistors which are driven in response to the reception of signals $PWM_{CCW}$ and $PWM_{CW}$ from a PWM wave generator (not shown) at the respective gates. The signal $PWM_{CCW}$ is inverted into a signal $PWM_{CW}$ by an inverter 20, and this signal $PWM_{CW}$ is again inverted into a signal $PWM_{CCW}$ by an inverter 21.

The signal $PWM_{CW}$ outputted by the inverter 20 is inputted to the switch circuits 1 and 2 and the base of an NPN transistor 25. The inverted PWM wave signal $PWM_{CCW}$ from the collector of the NPN transistor 25 is inputted to the gate of the transistor T4 and the base of an NPN transistor 24. The PWM wave signal $PWM_{CW}$ from the collector of the NPN transistor 24 is inputted to the gate of the transistor T2.

The PWM wave signal $PWM_{CCW}$ outputted by the inverter 21 is inputted to the switch circuits 3 and 4, and the base of an NPN transistor 22. The PWM wave signal $PWM_{CW}$ outputted by the collector of the NPN transistor 22 is inputted to the gate of the transistor T3 and the base of the NPN transistor 23. The signal $PWM_{CCW}$ from the collector of the NPN transistor 23 is inputted to the gate of the transistor T1.

As described with reference to FIG. 4, the source of each of the transistors T1 and T2 disposed toward the power source P is connected to the power source P, and the drain of each of the transistors T3 and T4 disposed toward the earth is connected to one terminal of the current detecting resistance Rs the other terminal of which is grounded. The source-side terminal of the current defecting resistance Rs is connected to the non-invertible input terminal of the second differential amplifier 10 through the switch circuit 1 and to the invertible input terminal thereof through the switch circuit 3. The other earth-side terminal of the current detecting resistance Rs is connected to the invertible input terminal of the second differential amplifier 10 through the switch circuit 2, and to the non-invertible input terminal thereof through the switch circuit 4.

EXAMPLE 2

EXAMPLE 2 will be described by referring to FIG. 7, wherein like reference numerals designate like elements and components to those in FIG. 4:

EXAMPLE 2 is different from EXAMPLE 1 in the following points. The source-side terminal of the current detecting resistance Rs is connected to the non-invertible input terminal of a second differential amplifier 10a and the invertible input terminal of another differential amplifier (hereinafter "third differential amplifier") 10b. The earth-side terminal of the resistance Rs is connected to the invertible input terminal of the second differential amplifier 10a and the non-invertible input terminal of the third differential amplifier 10b.

The output of the second differential amplifier 10a is inputted to the invertible input terminal of the differential amplifier 12 through the switch circuit 5 which receives an input of a PWM wave signal $PWM_{CW}$ and the output of the third differential amplifier 10b is inputted to the invertible input terminal of the differential amplifier 12 through the switch circuit 6 which receives an input of a PWM wave signal $PWM_{CCW}$. There is provided a resistance R between the output terminals of switch circuits 5, 6 and the invertible input terminal of the differential amplifier 12, and there is also provided a capacitor C between the output of the resistance R and the earth, so as to constitute a low-pass filter 7. The other structure is the same as that of EXAMPLE 1.

Figure 7:
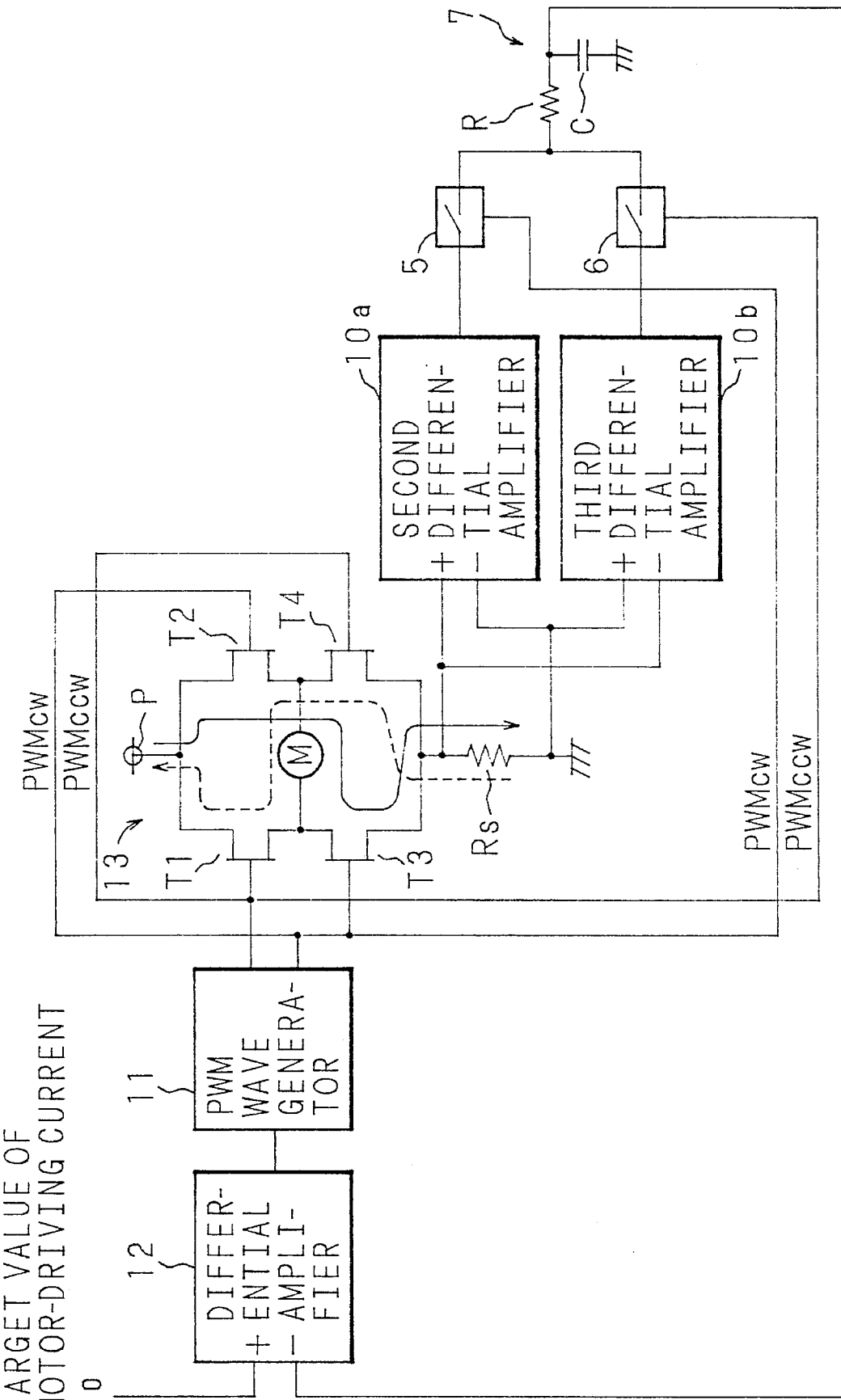
FIG. 7 is a block diagram showing a second example embodying the present invention.
Figure 8:
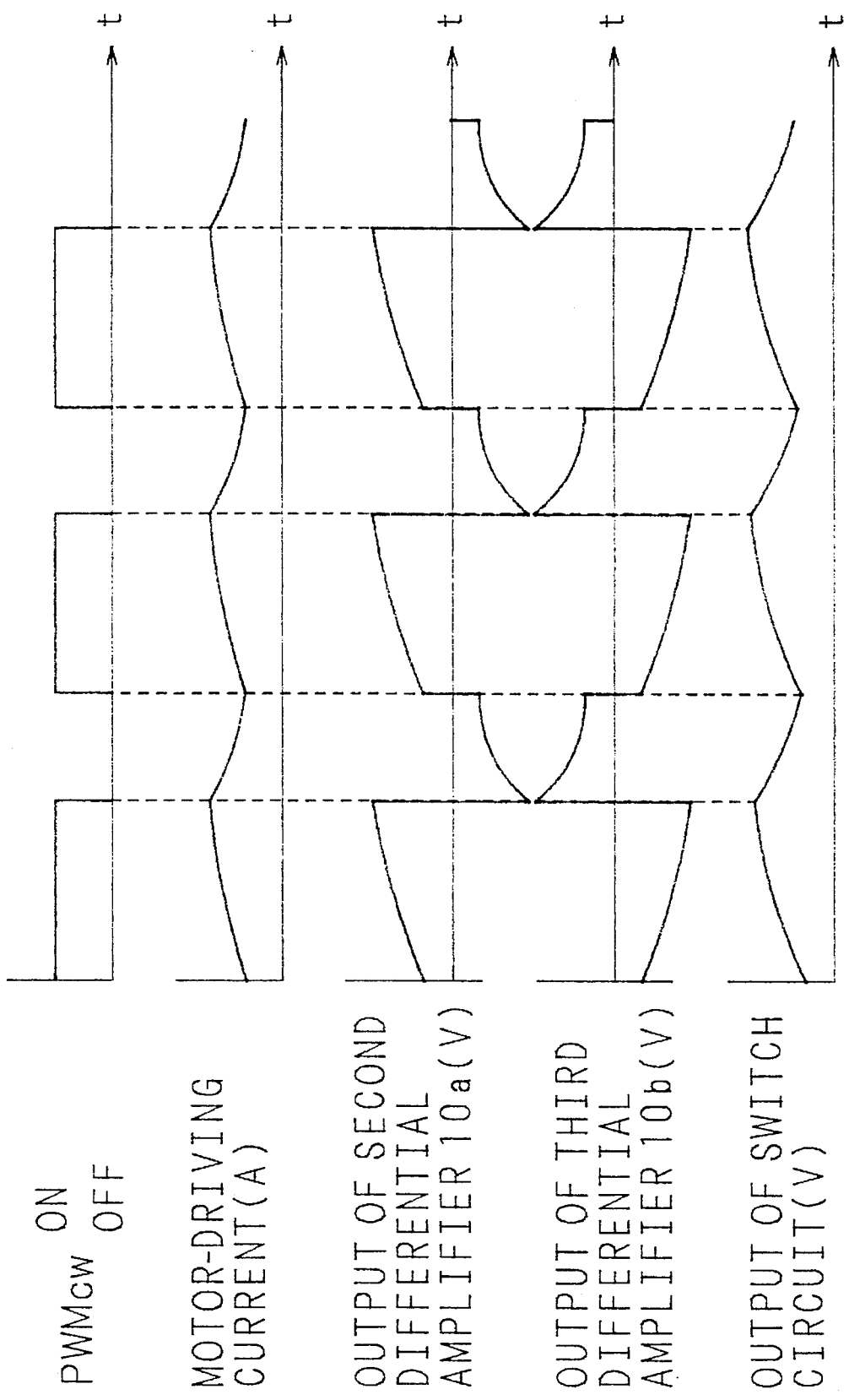
FIG. 8 shows waveforms of a signal in each part of the second example.

EXAMPLE 2 is operated as follows:

Referring to FIGS. 7 and 8, in a case where the duty ratio of the wave signal $PWM_{CW}$ is larger than that of the PWM wave signal $PWM_{CCW}$, if the signal $PWM_{CW}$ is on and the signal $PWM_{CCW}$ is off, the transistors T2 and T3 are on, and the transistors T1 and T4 are off. The motor-driving current is allowed to flow as indicated in the full line (FIG. 7).

At this stage, the output voltage of the second differential amplifier 10a becomes positive as shown in FIG. 8, and the output voltage of the third differential amplifier 10b becomes negative. The switch circuit 5 having an input of the signal $PWM_{CW}$ is on, and the switch circuit 6 having an input of the signal $PWM_{CCW}$ is off. As a result, the output voltages of the switch circuits 5 and 6 become positive as shown in FIG. 8.

When the PWM wave signal $PWM_{CW}$ is off and the PWM wave signal $PWM_{CCW}$ is on, the transistors T2 and T3 are off and the transistors T1 and T4 are on. However, owing to the inductance of the motor M, a voltage is induced in such a direction as to prevent the motor-driving current from abruptly changing in the motor M. The induced voltage becomes progressively stronger than the voltage at the power source P, and enables the motor-driving current to flow through the transistors T1 and T4 as indicated in the dotted line (FIG. 7). At this stage, as shown in FIG. 8, the output of the second differential amplifier 10a becomes negative, and the output of the third differential amplifier 10b becomes positive. The switch circuit 5 receiving an input of the PWM wave signal $PWM_{CW}$ is off, and the switch circuit 6 receiving an input of the PWM wave signal $PWM_{CCW}$ is on. As a result, the output voltage of the switch circuits 5 and 6 becomes positive as shown in FIG. 8.

Within the motor M the motor-driving current flows in the same direction (from right to left in FIG. 7) as it does when the PWM wave signal $PWM_{CW}$ is on. However, since it flows through the transistors T1 and T4, it flows in an opposite direction (from down to up in FIG. 7) when it passes through the resistance Rs to that in which it flows when the PWM wave signal $PWM_{CW}$ is on.

At this stage, the output of the switch circuits 5 and 6 has already become positive with the switch circuit 5 being off, and the switch circuit 6 being on because of switching from the output of the second differential amplifier 10a to that of the third differential amplifier 10b. In one periodic cycle of the PWM wave signal the output of the switch circuits 5 and 6 remains positive in the same way as it is when the PWM signal $PWM_{CW}$ is on.

In a case where the duty ratio of a PWM wave signal $PWM_{CCW}$ is larger than that of a PWM wave signal $PWM_{CW}$, the transistors T1 and T4 are on, and the transistors T2 and T3 are off when the PWM wave signal $PWM_{CCW}$ is on and the PWM wave signal $PWM_{CW}$ is off, thereby enabling a motor-driving current to flow in an opposite direction as indicated by the dotted line (FIG. 7).

As shown in FIG. 8, at the same time the output voltage of the second differential amplifier 10a becomes positive, and that of the third differential amplifier 10b becomes negative. The switch circuit 5 receiving an input of the PWM wave signal $PWM_{CW}$ are off, and the switch circuit 6 receiving an input of the PWM wave signal $PWM_{CCW}$ are on. As a result, the output voltage of the switch circuits 5 and 6 becomes positive as shown in FIG. 8.

When the PWM wave signal $PWM_{CW}$ is on, and the PWM wave signal $PWM_{CCW}$ is off, the transistors T1 and T4 are off and the transistors T2 and T3 are on. At this moment, owing to the inductance of the motor M a voltage is induced in such a direction as to prevent the motor-driving current from abruptly changing within the motor M. As the induced voltage progressively becomes stronger than the voltage at the power source P, a motor-driving current flows in an opposite direction as indicated by the full line (FIG. 7) through the transistors T2 and T3.

At this stage the output voltage of the differential amplifier 10a becomes negative, and that of the differential amplifier 10b becomes positive. The switch circuit 5 receiving an input of the PWM wave signal $PWM_{CW}$ is on, and the switch circuit 6 receiving an input of the PWM wave signal $PWM_{CCW}$ is off. As a result, the output voltage of the switch circuits 5 and 6 becomes negative. Within the motor M the motor-driving current flows in the same direction (from left to right in FIG. 7) as it does when the PWM wave signal $PWM_{CCW}$ is on, but since it flows through the transistors T2 and T3, it flows in an opposite direction to that it flows when the PWM wave signal $PWM_{CCW}$ is on.

At this moment, the switch circuit 5 is on, and the switch circuit 6 is off, so that the voltage is applied to the low-pass filter 7 by the second differential amplifier 10a in place of the third differential amplifier 10b through the switch circuit 5, thereby becoming negative. In this way the voltage applied to the low-pass filter 7 remains negative in one periodic cycle of the PWM wave signal in the same way as when the signal $PWM_{CCW}$ is on.

In the EXAMPLE 2, the motor-driving current value is detected together with the direction, and the output voltages from the switch circuits 5 and 6 can be used to perform the feedback control of the motor-driving current. In general, a signal of the voltage developed across the current detecting resistance Rs are adjusted to be relatively small but in EXAMPLE 2 a signal amplified by either of the differential amplifiers 10a and 10b is switched between the switch circuits 5 and 6, so that a difference between the input voltage and the output voltage can be minimized so as to reduce an unfavorable influence in comparison with EXAMPLE 1, thereby enhancing the degree of measuring accuracy.

EXAMPLE 3

When the switch circuits are used to switch one polarity to another of the voltage developed across the detecting resistance Rs synchronously with the PWM wave signals which drive the switching elements, a switching delay is likely to occur. Furthermore, when a switch circuit is provided at the output terminal of the amplifier as shown in FIG. 17, a responding delay occurs. Because of these switching and responding delays, the switching by the switch circuits cannot be concurrent with the polar inversion of the output signals of the amplifier, thereby resulting in an erroneous detection of signal.

Figure 9:
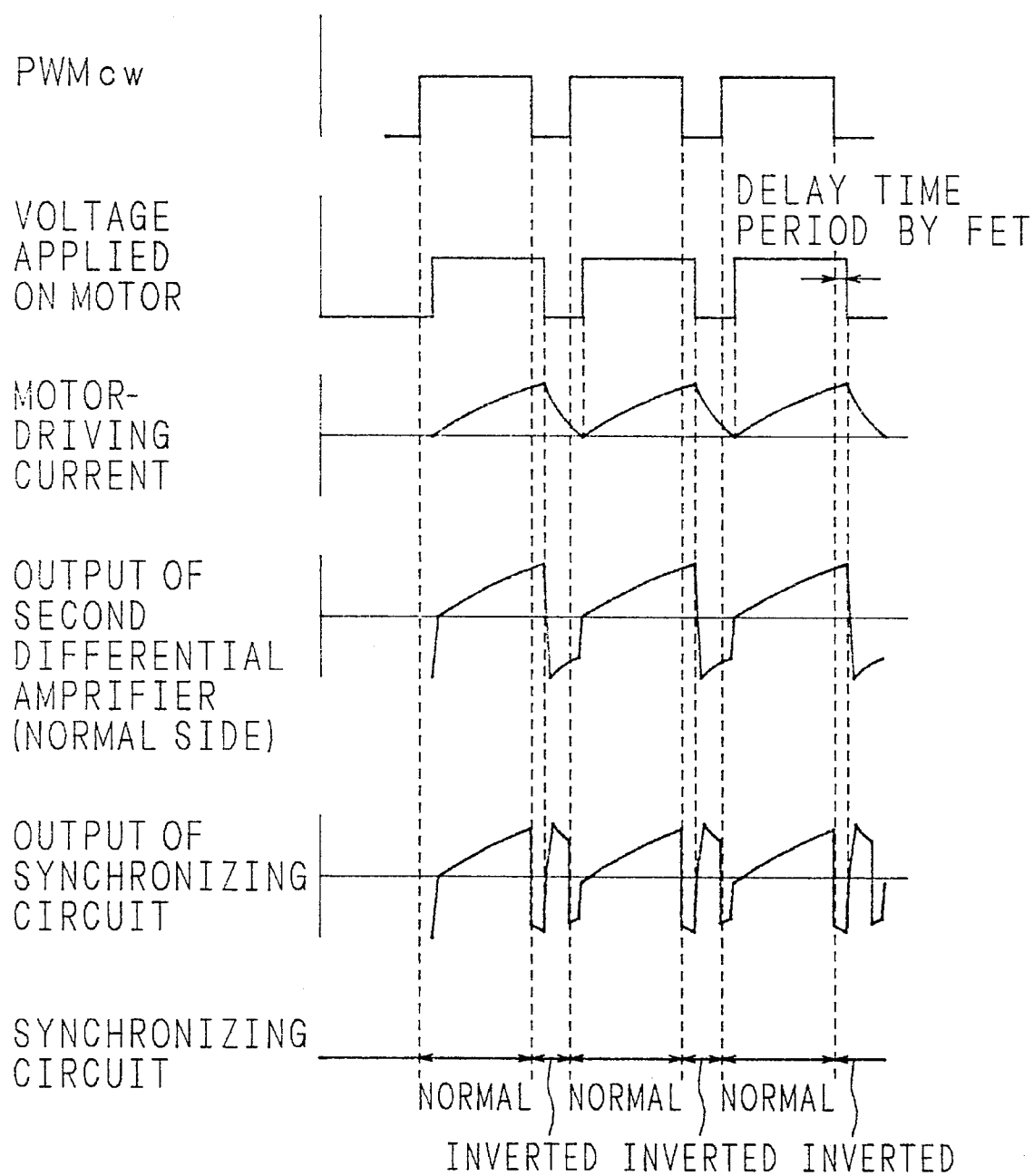
FIG. 9 shows other waveforms of a signal in each part of the second example.

For example, if the PWM wave signal $PWM_{CW}$ is delivered to the switching element (FET), a switching delay occurs in the motor-driving voltage as shown in FIG. 9, so that the motor-driving current is delayed for the delivery of the PWM wave signal $PWM_{CW}$. If the voltage developed across the detecting resistance Rs due to the delayed current is amplified, the polar inversion is delayed.

When, as shown in FIG. 9, the switch circuits (synchronizing circuits) are switched from one to another synchronously with the PWM wave signal, the voltage developed across the detecting resistance Rs amplified by the differential amplifier are subjected to polar inversion where it should not occur, because of the switching delay and responding delay. EXAMPLE 3 aims at avoiding an error occurring in detecting the signal.

Figure 10:
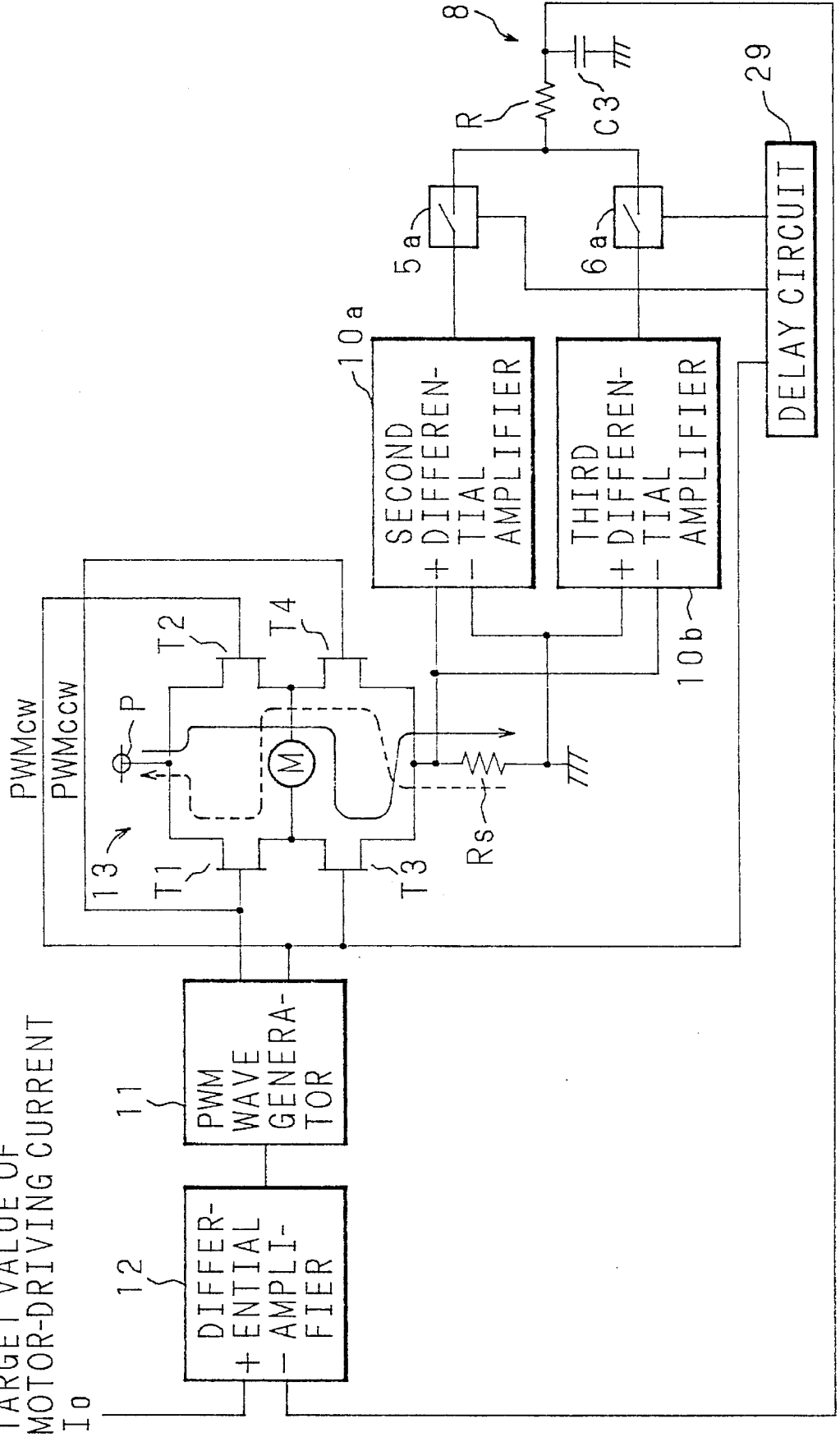
FIG. 10 is a block diagram showing a third example embodying the present invention.

Referring to FIG. 10, EXAMPLE 3 will be described:

There is provided a delay circuit 29 which allows a PWM wave signal $PWM_{CW}$ have a delayed leading edge thereof switches between switch circuits 5a and 6a by delaying PWM wave signals $PWM_{CW}$ and $PWM_{CCW}$, in contrast to EXAMPLE 2 where the switch circuits 5 and 6 are switched from one to the other directly by PWM wave signals $PWM_{CW}$ and $PWM_{CCW}$ in complementary relationship. The delay circuit 29 can delay the signals by at least up to the sum of delays in the switching of the transistors T1 to T4 and in the responding of the second and third differential amplifiers 10a and 10b.

There is provided a holding circuit 8 which includes a capacitor C3 having a larger capacitance in place of the capacitor C in the low-pass filter 7 in EXAMPLE 2 (FIG. 7). The holding circuit 8 holds the outputs of the switch circuits 5a and 6a during the delay time period of the delay circuit 29. The other structure is the same as that of EXAMPLE 2 in FIG. 7, and like elements are referred to by using like reference numerals so that description of it will be omitted for simplicity.

Figure 11:
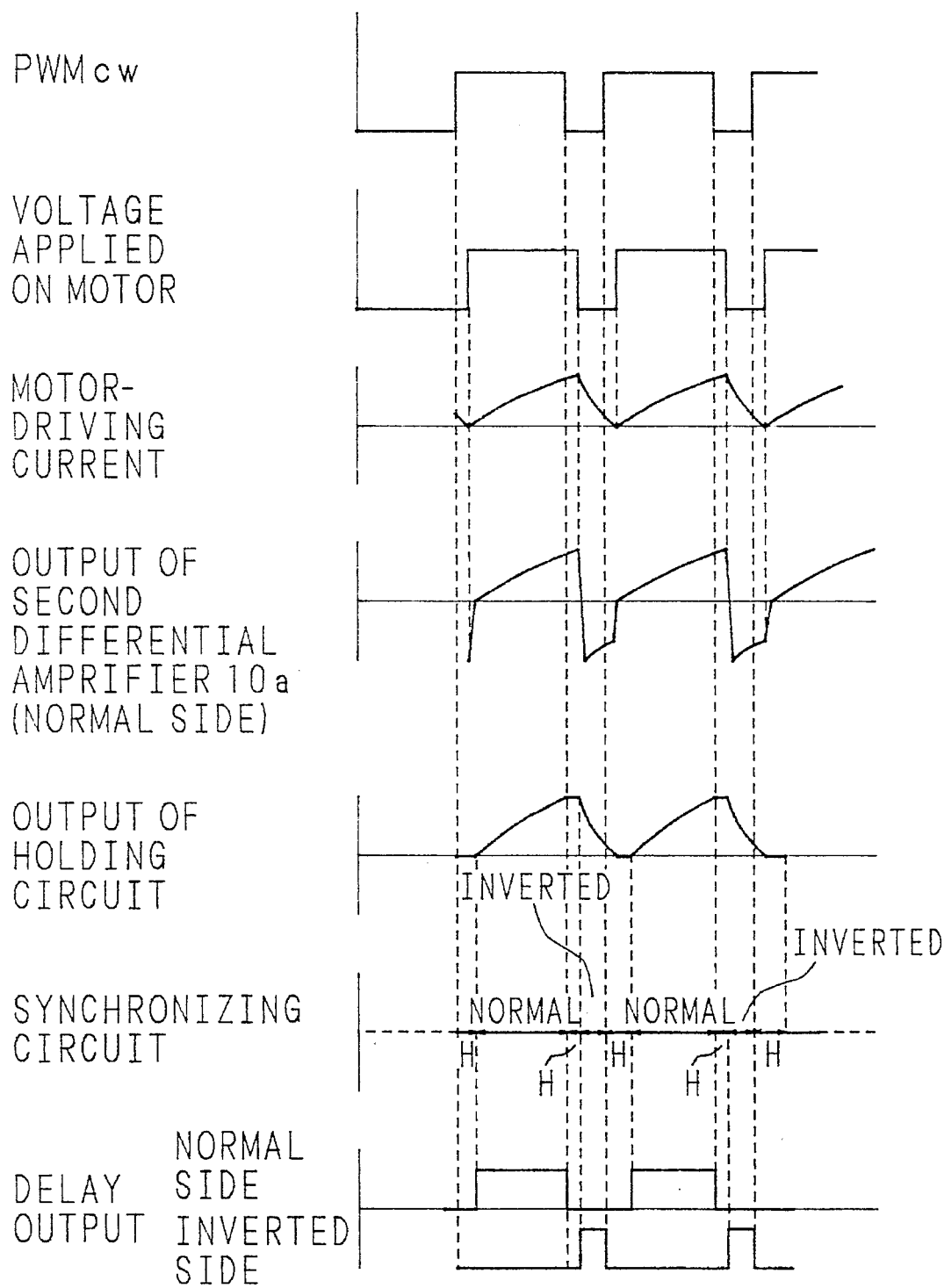
FIG. 11 shows waveforms of a signal in each part of the third example.

The power steering apparatus according to EXAMPLE 3 is operated as follows:

Referring to FIGS. 10 and 11, in a case where the duty ratio of the PWM wave signal $PWM_{CW}$ is larger than that of the PWM wave signal $PWM_{CCW}$, if the signal $PWM_{CW}$ is on and signal $PWM_{CCW}$ is off, the transistors T2 and T3 are on, and the transistors T1 and T4 are off. However, because of a delay in the switching, the rising of voltage applied on the motor M is delayed up to after the PWM wave signal $PWM_{CW}$ is changed as shown in FIG. 11. Accordingly, the motor-driving current is also delayed in flowing as indicated by the full line in FIG. 10.

The output voltage of the second differential amplifier 10a becomes positive because of the time required to rise owing to the delay in responding as shown in FIG. 11. The output voltage of the third differential amplifier 10b is one obtained by reversing the output voltage of the second differential amplifier 10a.

In response to the reception of a PWM wave signal $PWM_{CW}$, the delay circuit 29 outputs this signal $PWM_{CW}$ (on) having a delayed leading edge to the normal side of the switch circuit 5a, and a complementary signal (off) of the signal $PWM_{CW}$ to the inverted side of the switch circuit 6a. In this case, since the switch circuits 5a and 6a are on by low voltage signals, the inversion occurs within the delay circuit 29. As a result, the switch circuits 5a and 6a (synchronizing circuit) generate no outputs during the delay time period of the delay circuit 29 as shown in FIG. 11, and the holding circuit 8 outputs an output which it held immediately before, referred to as "H" in FIG. 11. Then the switch circuit 5a outputs a positive voltage from the normal side thereof.

When the PWM wave signal $PWM_{CW}$ is off, and the PWM wave signal $PWM_{CCW}$ is on, the transistors T2 and T3 are off, and the transistors T1 and T4 are on. However, because of the delay in switching, the falling of the voltage applied on the motor M is delayed up to after the PWM wave signal $PWM_{CW}$ is changed. Because of the inductance in the motor M, a voltage is induced in such a direction as to prevent the motor-driving current from abruptly changing within the motor M. As this induced voltage progressively becomes stronger than the voltage at the power source P, the motor-driving current flows through the transistors T1 and T4 as indicated in dotted lines in FIG. 10. At this stage the output voltage of the second differential amplifier 10a becomes negative as shown in FIG. 11. The output voltage of the third differential amplifier 10b is one obtained by inverting that of the second differential amplifier 10a.

In response to the reception of a PWM wave signal $PWM_{CW}$, the delay circuit 29 outputs this signal $PWM_{CW}$ (off) to the normal side of the switch circuit 5a, and a complementary signal (on) thereof having a delayed leading edge to the inverted side of the switch circuit 6a. As a result, the switch circuits 5a and 6a (synchronizing circuit) generate no outputs during the time period of the delay circuit 29 as shown in FIG. 11, and the holding circuit 8 outputs an output which it held immediately before, referred to as "H" in FIG. 11. Then the switch circuit 6a outputs a positive voltage from the inverted side thereof.

At this time, within the motor M the motor-driving current flows in the same direction (from right to left in FIG. 10) as that in which it flows when the PWM wave signal $PWM_{CW}$ is on. However, since it flows through the transistors T1 and T4, the motor-driving current flows in an opposite direction (from down to up in FIG. 10) in the current detecting resistance Rs to the direction in which it flows when the PWM wave signal $PWM_{CW}$ is on. At this stage, as the switch circuit 5a is off, and the switch circuit 6a is on, the voltage generator is changed from the second differential amplifier 10a to the third differential amplifier 10b. In this way in one periodic cycle of the PWM wave signal the output voltage of the switch circuit 6a remains positive as when the PWM wave signal $PWM_{CW}$ is on.

When the duty ratio of a PWM wave signal $PWM_{CCW}$ is larger than that of a PWM wave signal $PWM_{CW}$, the motor-driving current flows in an opposite direction to that mentioned above. In this case, the output voltage of the switch circuits 5a and 6a remain negative in one period cycle of the PWM wave signal as when the signal $PWM_{CCW}$ is on.

In this manner, the motor-driving current value and the flowing direction within the motor M are both detected in EXAMPLE 3, and the output voltages of the switch circuits 5a and 6a can be used to perform the feedback control of the motor-driving current.

The delay circuit 29 delays the leading edge of each of the PWM wave signal $PWM_{CW}$ and the complementary signal thereof, thereby switching the switch circuits 5a and 6a synchronously with the output signal of the delay circuit 29. During the delay time period of the delay circuit 29 the holding circuit 8 holds immediately previous outputs of the switch circuits 5a and 6a and outputs then. Thus, a detection error due to delays in switching the transistors T1 to T4 and a response delay occurring in the second and third differential amplifiers 10a and 10b can be minimized, and a blank time of the switch circuits output, because of the delayed leading edge of the signal $PWM_{CW}$ and the complementary signal thereof, wherein the blank time occurs during the "off" period of time of the switch circuits, can be compensated with an immediately previous output. In this way a detection error in the motor-driving current is prevented.

Figure 12:
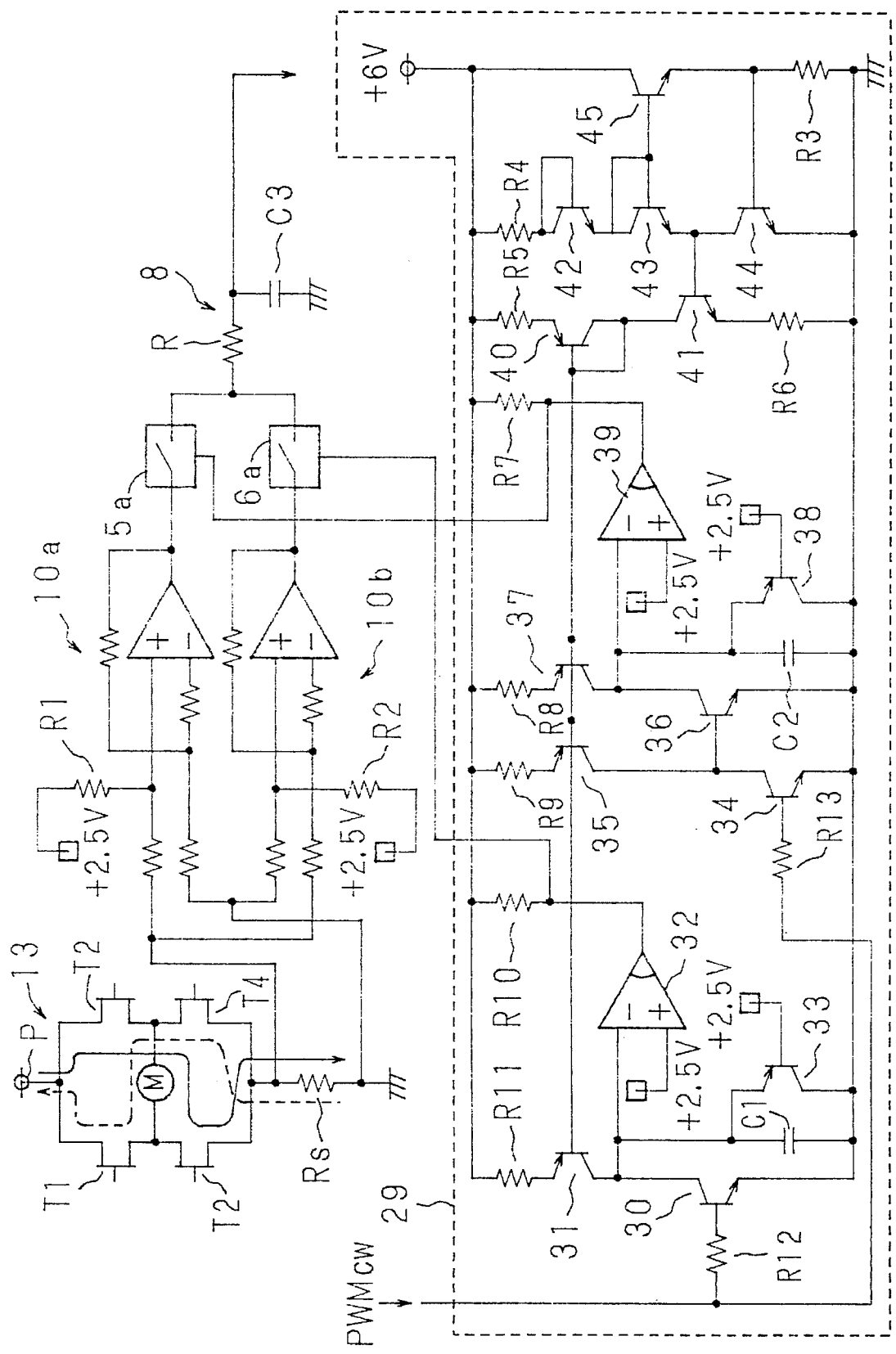
FIG. 12 is a circuit diagram showing the structure of the third example in a greater detail.

Referring to FIG. 12, wherein the PWM wave generator 11 and the differential amplifier 12 both shown in FIG. 10 are omitted for avoiding repetition, a practical form of the power steering apparatus according to EXAMPLE 3 will be described:

The motor-driving circuit 13 includes transistors T1 to T4 which are FETs in bridge connection and a motor M disposed in such a manner as to bridge the junction between the transistors T1 and T3 and the junction between the transistors T2 and T4. The pair of the transistors T1 and T4, and the pair of the transistors T2 and T3 are driven in response to the reception of PWM wave signals $PWM_{CCW}$ and $PWM_{CW}$ from the PWM wave generator (not shown) at the respective gates.

The sources of the transistors T1 and T2, which are located toward the power source P of the motor-driving circuit 13, are connected to the power source P, and the drains of the transistors T3 and T4, which are located toward the earth, are connected to the motor-driving current detecting resistance ("detecting resistance") Rs whose other end is grounded.

The source-side terminal of the detecting resistance Rs is connected to a non-invertible input terminal of the second differential amplifier 10a and the invertible input terminal of the third differential amplifier 10b. The earth-side terminal of the detecting resistance Rs is connected to the invertible input terminal of the second differential amplifier 10a and the non-invertible input terminal of the third differential amplifier 10b.

The non-invertible terminals of the second differential amplifiers 10a and 10b are given a constant voltage of 2.5 V through resistances R1 and R2, respectively.

A holding circuit 8 is constituted with a resistance R and a capacitor C3. More specifically, the resistance R is connected to the output terminals of the switch circuits 5a and 6a whose input terminals are connected to the output terminals of the second and third differential amplifiers 10a and 10b, and the capacitor C3 is disposed between the output of the resistance R and the earth.

In the delay circuit 29 the PWM wave signal $PWM_{CW}$ is given to the base of an NPN transistor 30 through a resistance R12, and the emitter of the NPN transistor 30 is grounded. The collector thereof is connected to an invertible input terminal of a comparator 32, and is also connected to the collector of another PNP transistor 31 whose emitter is connected to a +6 V power source through a resistance R11.

The invertible input terminal of the comparator 32 is connected to a capacitor C1 which is grounded, and to the emitter of a further PNP transistor 33 which is given a constant voltage of 2.5 V at its base and is grounded at its collector.

The non-invertible input terminal of the comparator 32 is given a constant voltage of 2.5 V, and the output terminal thereof is connected to a +6 V source through a resistance R10. The output terminal of the comparator 32 is connected to a control terminal of the switch circuit 6a.

The PWM wave signal $PWM_{CW}$ is also given to the base of an NPN transistor 34 through a resistance R13, and the emitter of the NPN transistor 34 is grounded. The collector thereof is connected to the collector of a PNP transistor 35 whose emitter is connected to the +6 V source through a resistance R9.

The collector of the NPN transistor 34 is connected to the base of an NPN transistor 36 whose emitter is grounded. The collector thereof is connected to an invertible input terminal of a comparator 39. The collector of the NPN transistor 36 is connected to the collector of a PNP transistor 37 whose emitter is connected to the +6 V source through a resistance 8.

The invertible input terminal of the comparator 39 is connected to a capacitor C2 which is grounded, and to the emitter of a PNP transistor 38 which is given a constant voltage of 2.5 V at its base and is grounded at its collector.

The non-invertible input terminal of the comparator 39 is given a reference voltage of 2.5 V, and the output terminal thereof is connected to the 6 V source through a resistance R7. The output terminal of the comparator 39 is connected to a control terminal of the switch circuit 5a.

The base of each of the PNP transistors 31, 35 and 37 is connected to the base and collector of a PNP transistor 40 whose emitter is connected to the 6 V source through a resistance RS. The collector of the PNP transistor 40 is connected to the collector of an NPN transistor 41 whose emitter is connected to a resistance R6 which is grounded.

The base of the NPN transistor 41 is connected to the emitter of an NPN transistor 43, and to the collector of an NPN transistor 44 whose emitter is grounded. The collector and base of the NPN transistors 43 are connected to the emitter of an NPN transistor 42, and the collector and base of the NPN transistors 42 are connected to the 6 V source through a resistance R4.

The base of the NPN transistor 43 is connected to the base of the NPN transistor 45. The collector of the NPN transistor 45 is connected to the 6 V source, and the emitter thereof is connected to a resistance R3 which is grounded and also to the base of the NPN transistor 44.

The PNP transistor 40 gives a constant voltage to the base of each of the PNP transistors 31, 35 and 37 so as to make them into rated power sources. The NPN transistors 41, 42, 43, 44 and 45 constitute a constant voltage circuit which keeps the collector of the PNP transistor 40 at a constant voltage.

In the delay circuit 29 the NPN transistor 30 is on when the PWM wave signal $PWM_{CW}$ is on. The invertible input terminal of the comparator 32 drops virtually to the earth voltage through the NPN transistor 30, thereby enabling the comparator 32 to output a positive voltage to turn off the switch circuit 6a (wherein the switch circuits 5a and 6a are on with a low voltage.) At the same time, the NPN transistor 34 is also on, and the base of the NPN transistor 36 becomes virtually equal to the earth voltage, so that the NPN transistor 36 is off. The capacitor C2 begins to be charged by the PNP transistor 37 which functions as a constant current source, thereby gradually raising the voltage at the invertible input terminal of the comparator 39. The speed at which the capacitor C2 is charged depends upon the magnitude of a current flowing through the PNP transistor 37 which functions as a constant current source.

When the capacitor C2 gradually is charged up, and finally the voltage at the invertible input terminal of the comparator 39 exceeds 2.5 V, the comparator 39 outputs a negative voltage, thereby turning the switch circuit 5a on.

As the capacitor C2 is further charged up to the extent that the invertible input terminal of the comparator 39 exceeds (2.5 V+an emitter-base voltage of the PNP transistor 38), the PNP transistor 38 is on, thereby causing the capacitor C2 to discharge undesirably. Therefore, the voltage stepping-up is stopped.

When the PWM wave signal $PWM_{CW}$ is off, the NPN transistor 34 is off, and the NPN transistor 36 is on. Thus the capacitor instantaneously discharges through the NPN transistor 36. As a result, the invertible input terminal of the comparator 39 becomes equal to the earth voltage through the NPN transistor 36, thereby enabling the comparator 39 to output a positive voltage. The switch circuit 5a instantaneously becomes off when the PWM wave signal $PWM_{CW}$ is off.

At this moment, the NPN transistor 30 becomes off, and the capacitor C1 begins to be charged up by the PNP transistor 31. In this way, the invertible input terminal of the comparator 32 is gradually charged up. The speed at which the capacitor C1 is charged up depends upon the magnitude of a constant current flowing through the PNP transistor 31.

When the capacitor C1 gradually is charged up, and finally the voltage at the invertible input terminal of the comparator 32 exceeds 2.5 V, the comparator 32 outputs a negative voltage, thereby turning the switch circuit 6a on.

As the capacitor C1 is charged up to the extent that the voltage at the invertible input terminal of the comparator 32 exceeds (2.5 V+an emitter-base voltage of the PNP transistor 33), the PNP transistor 33 is on, thereby allowing the capacitor C1 to discharge. Thus the voltage at the invertible input terminal of the comparator 32 is stopped from being stepped up.

EXAMPLE 4

EXAMPLE 4 will be described by way of example by reference to FIG. 13:

EXAMPLE 4 is constructed such that an output from the switch circuit receiving a delayed PWM wave signal $PWM_{CW}$ and its complementary signal is inputted to a second differential amplifier 10 through a holding circuit 8, in contrast to EXAMPLE 3 where an output from the differential amplifier is outputted through the switch circuit receiving a delayed PWM wave signal $PWM_{CW}$ and its complementary signal. The delay of the delay circuit 29 is determined to be at least equal to the delay in switching the transistors T1 to T4.

The holding circuit 8 has the same structure as that shown in FIG. 10, and holds output signals from the switch circuits 1 to 4 during the time period of the delay circuit 29. In FIG. 13, like reference numerals designate like elements and components to those in FIG. 4, and a description of them is omitted for avoiding repetition.

EXAMPLE 4 is as advantageous as EXAMPLE 3 in that a detection error due to delays in switching the transistor T1 to T4 can be minimized, and a blank time of the switch circuits output, because of the delayed leading edge of the signal $PWM_{CW}$ and the complementary signal thereof, wherein the blank time occurs during the "off" period of time of the switch circuits, can be compensated with an immediately previous output. In this way the accuracy of the detection of the motor-driving current is maintained.

Throughout the description of EXAMPLES 1 to 4 the motor-driving current detecting resistance Rs is inserted between the motor driving circuit 13 and the earth, but it is possible to insert it between the motor driving circuit 13 and the positive electrode of the power source P.

According to the present invention, no extra circuit is required to judge the direction of a motor-driving current, and nevertheless it is possible to accurately perform the feedback control of the motor-driving current. Thus the power steering apparatus of the present invention ensures a smooth steering touch and feeling. In addition, a difference between the input voltage and the output voltage in a switch circuit can be minimized, thereby avoiding an unfavorable influence due to the difference. Furthermore, a detection error due to the delay in switching the switch circuits can be eliminated. A blank time of the switch circuits output, because of the delayed leading edge of the PWM wave signal can be compensated with an immediately previous output, thereby reducing an error occurring in the detection of a motor-driving current.

As this invention may be embodied in several forms without departing from the spirit of essential characteristics thereof, the examples herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A power steering apparatus for producing a steering assisting power through the control of the duty cycle of a PWM wave signal delivered to control the motor driving in accordance with a detected motor-driving current, the power steering apparatus comprising:

a motor driving circuit including a motor connected to bridge-connected switching elements in such a manner as to bridge two opposite pairs of the switching elements;

a PWM wave generating circuit for driving a selected pair of switching elements connected in series through the motor;

a motor-driving current detecting resistance connected between the motor driving circuit and a power source for the motor; and a motor-driving current detecting circuit including a switch circuit for switching from one polarity to the other of the voltage developed across the motor-driving current detecting resistance in synchronism with the PWM wave signal and detecting a motor-driving current on the basis of an output from the switch circuit.

2. The power steering apparatus according to claim 1, wherein the motor-driving current detecting circuit comprises an amplifier connected to the motor-driving current detecting resistance, and wherein the switch circuit is connected to the output terminal of the amplifier.

3. The power steering apparatus according to claim 1, further comprising a delay circuit receiving a-PWM wave signal and delaying the leading edge thereof before it is outputted to the switch circuit, and wherein the switch circuit switches from one polarity to the other of the voltage developed across the motor-driving current detecting resistance synchronously with an output signal from the delay circuit.

4. The power steering apparatus according to claim 2, further comprising a delay circuit receiving a PWM wave signal and delaying the leading edge thereof before it is outputted to the switch circuit, and wherein the switch circuit switches from one polarity to the other of the voltage developed across the motor-driving current detecting resistance synchronously with an output signal from the delay circuit.

5. The power steering apparatus according to claim 3, further comprising a holding circuit for holding an output from the switch circuit during the delay time period of the delay circuit.

6. The power steering apparatus according to claim 4, further comprising a holding circuit for holding an output from the switch circuit during the delay time period of the delay circuit.

* * * * *